April 4, 1944.        C. A. WINSLOW ET AL        2,345,848
OIL CONDITIONER
Filed May 26, 1941
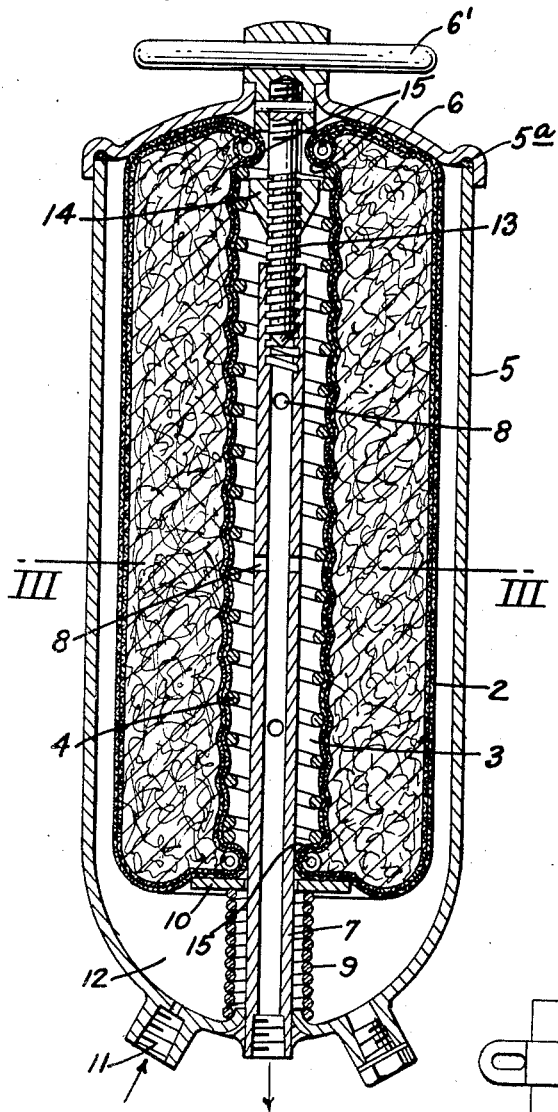
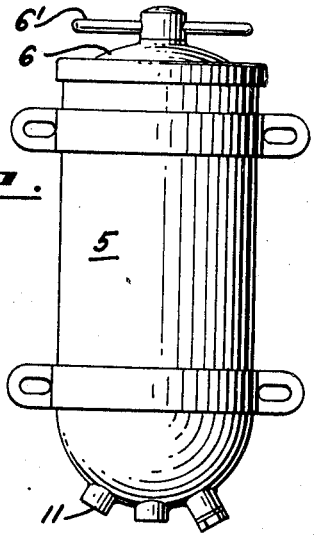
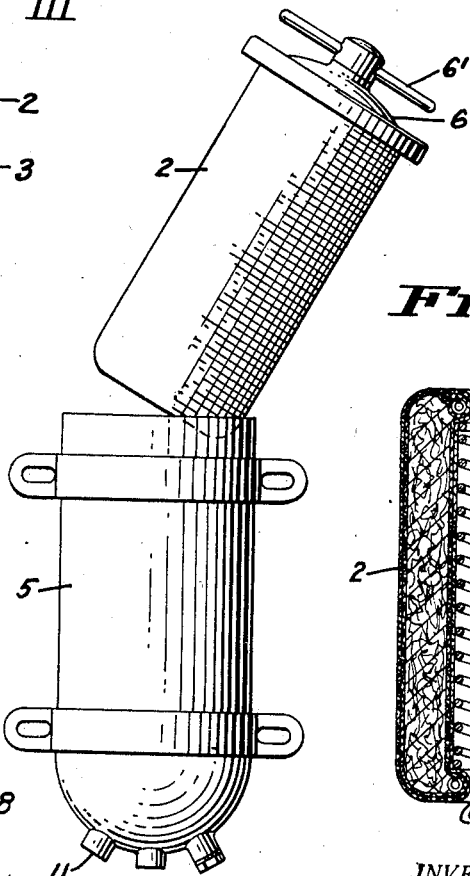
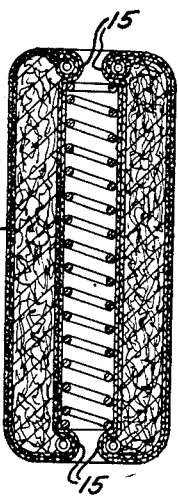
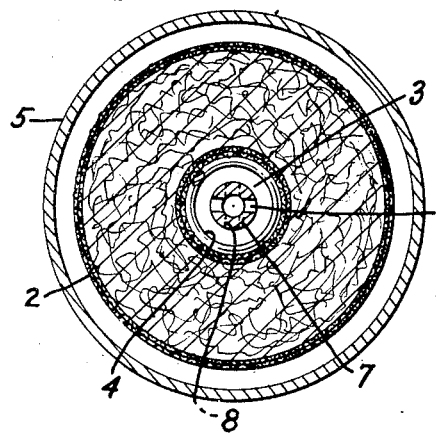
INVENTORS
CHARLES A. WINSLOW
LAURENCE L. MOORE
BY
Chas. E. Townsend
ATTORNEY.

Patented Apr. 4, 1944

2,345,848

UNITED STATES PATENT OFFICE 2,345,848

OIL CONDITIONER

Charles A. Winslow and Laurence L. Moore, Oakland, Calif., assignors to Winslow Engineering Co., Oakland, Calif., a partnership consisting of Charles A. Winslow, Catherine B. Winslow, Laurence L. Moore, and William G. Nostrand Application May 26, 1941, Serial No. 395,224

5 Claims. (Cl. 210—140)

The present invention relates to a novel means of purifying lubricants; and one of its principal objects is the provision of improved and efficient oil conditioning and purifying apparatus for engines and like machines. More particularly, it relates to an oil conditioning apparatus of simple and compact construction, which is adapted to employ a removable filter element in cartridge form, for purifying lubricants and capable, in operation, of giving the optimum results in a minimum of time.

The present invention is a continuation of our copending application Serial Number 258,653, filed February 27, 1939, now Patent No. 2,314,640, issued March 23, 1943.

We employ a cartridge such as is disclosed in said earlier application since it provides a construction which permits a maximum flow rate through the element for the purpose of bringing the fluid to be filtered and processed into contact with the materials in the element for the purpose of changing the nature of deleterious substances contained in the lubricating oil, fuel oil or other fluids to be reconditioned and cleaned.

More particularly the invention resides in the provision of a novel casing to house the above porous flexible element, said housing being preferably made of cylindrical form with a fluid inlet at or near the bottom and a central outlet terminating at or near the bottom; a central outlet being preferably of tubular form attached to the bottom of the casing, said tubular outlet being preferably provided with a plurality of lateral holes in its upper portion and a threaded section at its upper extremity. A cover for the casing is provided with a central threaded extension which includes a conical plug attached thereto. Said threaded extension and plug are adapted to enter the upper end of the porous filtering element and engage the upper end of the central outlet tube. It is understood that the threaded extension and conical plug are adapted to hold the element to the cover when said cover is removed, thus forming an automatic means of withdrawing and ejecting the element from the casing when the cover is removed.

Having reference to the accompanying drawing:

Fig. 1 is a vertical, central section of our oil conditioning apparatus.

Fig. 2 is an elevation of the oil conditioner assembled and ready for installation.

Fig. 3 is a horizontal section on the line III—III of Fig. 1.

Fig. 4 shows ready removability of the cartridge on unscrewing the top of the casing.

Fig. 5 is an elevation of a filter cartridge, in section, before placing in the conditioner casing.

Referring particularly to Figs. 4 and 5, the filter element or cartridge A here employed consists essentially of a cylindrical body filled with suitable filtering material, such as cotton waste and wood shavings, encased in an envelope of two-ply fabric 2 and having a central opening 3 which is expanded in the manner shown by a cylindrical coil spring 4 and constructed and assembled according to the teachings of our said application Serial Number 258,653, now Patent No. 2,314,640, issued March 23, 1943.

This cartridge is adapted to fit loosely into a cylindrical casing 5, having a cover 6 and provided with a central, vertical standpipe 7, suitably secured in the bottom of the casing and extending to within a short distance of the top of the casing.

The standpipe 7 has the oil ports 8 through which the filtered and reconditioned oil may find outlet. The lower end of the standpipe 7 is surrounded by a coiled ejector spring 9, which seats on the bottom of the casing. A plate or washer 10 rests on the spring 9 and the cartridge, in turn, rests on the plate.

The inlet for the fouled oil to be reconditioned is at 11 into a sump 12 in the bottom of the casing. As a matter of fact, this sump extends upwardly all around the cartridge, because in our machine the whole filtration action takes place completely around the cartridge and radially inward to the central opening or chamber 3 of the cartridge, thence through the ports 8 into the standpipe 7, and thence to any desired point of reuse.

The cover 6 has a handle 6' for ease of manipulation. The cartridge is maintained forcibly in position in the casing and against the expansive action of the ejector spring 9 only by the cover 6. The cover 6 carries a rod 13 which projects downwardly into the casing and is threaded to engage the correspondingly threaded upper end of the standpipe 7. The cover is held in place by turning the handle 6' to screw the rod into the tube 7; a tight seal being formed between the cover and casing by a suitable gasket 5ª.

Intermediate the cover and the threaded end portion of the rod 13 is a conical protuberance 14 which is adapted, when the rod is inserted into the central bore of a cartridge, to engage behind an inwardly formed annular ledge or constricted shoulder 15 which is formed at each end of a cartridge. In other words, these cartridges are symmetrical and either end is adapted to fit this plug on the cover formed by rod 13 and cone 14, and to be pushed on over the cone 14 which is preferably threaded and adjustable on the rod 13.

The result is that when a cartridge, cover and plug are assembled in the manner described they operate as a unit when being placed in position in and on the casing and on removal from the casing.

Thus it is apparent that the cover is provided with special means to engage the core of the cartridge so that to remove or change the cartridge the latter can be withdrawn positively from the core on the removal of the cover, as shown in Fig. 4.

The spring 9 in the casing insures an even upward pressure on the washer 10 and thereby upon the cartridge element A. The stiff central coil spring 4 of the cartridge resists any tendency of the action of the lighter spring 9 to shorten the length of the cartridge. Any shortening of the cartridge would reduce the effective filtering peripheral area of the cartridge.

On unscrewing the cover, the spring 9, which has been maintained under compression, immediately kicks the cartridge upward so that its removal is facilitated. By having the cartridge coupled to the cover by means of the plug and protuberant cone-shaped flange 14 it is never necessary manually to handle the very dirty sludge-coated used cartridge. This is an important feature of the invention as it eliminates the worst problem of getting out a used element from a deep shell.

In the past it has been common practice to be compelled to use packing hooks, screwdrivers, pliers, etc., to get a dirty used element out of some types of oil filters, particularly those that have used a porous fabric covering which sealed on the casing and became plugged tightly into the casing with gummy sludge. When our filter element is housed in our novel casing, as herein illustrated, it is always clear of the shell and also free of sludge during its normal life.

With the cover projection 13, with its enlargement 14, plugged into the cartridge, the latter on unscrewing of the projection 13 from the tube 7, by turning the cover handle 6', will be pushed upwardly above the shell and come out easily and without the hands of the operator coming in contact with the sludge-covered cartridge.

What we claim is:

1. The combination in an oil conditioning apparatus, of a cylindrical casing with a removable cover, a central perforated outlet tube in the casing and extending upwardly and centrally therein, said tube closed at one end, a hollow, tubular purifying cartridge surrounding the tube and out of contact therewith except at the lower end where it is in sealing contact with the tube to prevent oil from by-passing the cartridge, said cartridge being of substantially less diameter than the casing so as to leave an annular oil space entirely around the cartridge, an oil inlet into said annular oil space, a coil spring surrounding the outlet pipe and seated on the bottom of the casing, a washer resting on said spring and the cartridge seating on said washer and against the cover to prevent by-passage of the cartridge at its upper end, said spring being on compression when the cover is in place on the casing, means for holding the cover in place on the casing, and means carried by said last named means engaging the cartridge thereby coupling the cartridge and the cover so that the cover and the cartridge may be removed from the casing as a unit.

2. In combination, an oil purifying device having a casing with an inlet, a removable cover, a central perforated outlet tube closed at one end, a hollow tubular flexible purifying cartridge element surrounding the central outlet tube, said purifying element containing constricting means at each end, said constricting means at the lower end of the cartridge adapted to embrace the tube and prevent oil from by-passing the element, said cartridge bearing against the cover to prevent by-passing of the cartridge at its upper end, means to hold the cover in place on the casing, and means carried by said last named means engaging the interior of a constricted end of the element thereby coupling said element and said cover so that the element and cover may be removed from the casing as a unit.

3. In a lubricant purifier, a casing with an inlet and an outlet, a perforated centrally disposed outlet tube within the casing, a removable cover for the casing, a porous fabric-covered tubular purifying element surrounding the outlet tube and circumferentially spaced from the casing, means for spacing the element from the central tube, means at one end of the purifying element engaging the tube to prevent oil from by-passing the element, the cartridge bearing against the cover to prevent by-passing of the cartridge at its upper end, and means carried by the cover engaging the tube to hold the cover in place and having a coupling member carried by said last mentioned means engaging the adjacent end of the element thereby coupling the cover and the element so that the cover and the element may be removed from the casing as a unit.

4. The combination in an oil conditioning apparatus, of a cylindrical casing with an inlet, a removable cover, a central outlet tube in the casing and extending upwardly and centrally therein, a filtering cartridge surrounding the outlet tube and spaced from the casing wall, means on the cartridge engaging the tube to prevent oil on entering the casing from by-passing the cartridge, a plug on the cover having a screw connection with the tube to secure the cover in closed position, and means on the plug engaging the cartridge to couple the cartridge to the plug, whereby, on the detachment of the plug from the tube, the cartridge will be removed as a unit with the cover.

5. The combination in an oil conditioning apparatus, of a casing with an inlet, a removable cover, an outlet tube centrally disposed within the casing, a filtering cartridge surrounding the outlet tube and spaced from the casing, means on the cartridge engaging the tube to prevent oil on entering the casing from by-passing the cartridge, said cover having a screw member engaging the tube to secure the cover in closed position, and a threaded conical member carried by the screw member and telescoping in interlocked position with the cartridge so that when the cover is removed it automatically withdraws the cartridge from the casing.

CHARLES A. WINSLOW.
LAURENCE L. MOORE.